United States Patent
Hayashi et al.

(10) Patent No.: US 6,768,506 B2
(45) Date of Patent: Jul. 27, 2004

(54) IMAGE FORMATION WITH A REDUCED RECORDING POSITION DEVIATION BETWEEN SCANNING OPTICAL SYSTEMS

(75) Inventors: Yoshinori Hayashi, Kanagawa (JP); Satoru Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 09/982,831

(22) Filed: Oct. 22, 2001

(65) Prior Publication Data

US 2003/0002122 A1 Jan. 2, 2003

(30) Foreign Application Priority Data

Oct. 27, 2000 (JP) ......................................... 2000-328806

(51) Int. Cl.[7] ............................................... B41J 2/435
(52) U.S. Cl. ..................................... 347/235; 347/250
(58) Field of Search ................................. 347/116, 117, 347/233, 234, 235, 248, 250; 359/201, 204, 205

(56) References Cited

U.S. PATENT DOCUMENTS

| | | | | |
|---|---|---|---|---|
| 5,107,280 A | * | 4/1992 | Ohashi et al. ............... | 347/235 |
| 5,557,448 A | | 9/1996 | Endo et al. .................. | 359/208 |
| 5,570,224 A | | 10/1996 | Endo et al. .................. | 359/212 |
| 5,581,392 A | | 12/1996 | Hayashi ....................... | 359/205 |
| 5,652,670 A | | 7/1997 | Hayashi et al. .............. | 359/205 |
| 5,654,817 A | * | 8/1997 | De Loor ...................... | 359/201 |
| 5,786,594 A | | 7/1998 | Ito et al. ..................... | 250/236 |
| 5,875,051 A | | 2/1999 | Suzuki et al. ................ | 359/205 |
| 5,877,885 A | * | 3/1999 | Suda et al. .................. | 359/201 |
| 5,903,378 A | * | 5/1999 | Takano et al. ............... | 359/201 |
| 5,986,791 A | | 11/1999 | Suzuki et al. ................ | 359/207 |
| 6,069,724 A | | 5/2000 | Hayashi et al. .............. | 359/206 |
| 6,081,386 A | | 6/2000 | Hayashi et al. .............. | 359/641 |
| 6,104,522 A | | 8/2000 | Hayashi et al. .............. | 359/207 |
| 6,141,133 A | | 10/2000 | Suzuki et al. ................ | 359/207 |
| 6,185,026 B1 | | 2/2001 | Hayashi et al. .............. | 359/204 |
| 6,198,562 B1 | | 3/2001 | Hayashi et al. .............. | 359/204 |
| 6,222,662 B1 | | 4/2001 | Suzuki et al. ................ | 359/205 |
| 6,229,638 B1 | | 5/2001 | Sakai et al. .................. | 359/212 |
| 6,239,860 B1 | | 5/2001 | Ito .............................. | 355/41 |

(List continued on next page.)

FOREIGN PATENT DOCUMENTS

| | | | | |
|---|---|---|---|---|
| JP | 4-277771 | * | 10/1992 | .......... G03G/15/04 |
| JP | 8-72308 | * | 3/1996 | .............. B41J/2/44 |
| JP | 10-246861 | | 9/1998 | |
| JP | 11-212009 | | 8/1999 | |

OTHER PUBLICATIONS

U.S. patent application Ser. No. 09/982,831, Hayashi et al., filed Oct. 22, 2001.
U.S. patent application Ser. No. 10/421,786, Atsuumi et al., filed Apr. 24, 2003, pending.
U.S. patent application Ser. No. 10/382,530, Hayashi et al., filed Mar. 7, 2003, pending.
U.S. patent application Ser. No. 10/386,654, Amada et al., filed Mar. 13, 2003, pending.
U.S. patent application Ser. No. 10/375,036, Suzuki et al., filed Feb. 28, 2003.
U.S. patent application Ser. No. 10/347,746, Suzuki et al., filed Jan. 22, 2003, pending.

Primary Examiner—Hai Pham
(74) Attorney, Agent, or Firm—Oblon, Spivak, McClelland, Maier & Neustadt, P.C.

(57) ABSTRACT

An optical scanning device includes a plurality of scanning optical systems arranged in a main scanning direction. Each of the scanning optical systems includes a plurality of light sources emitting light beams, a light source driving circuit modulating the emitted light beams separately, and a deflector causing the light beams to perform scanning. At least one of the scanning optical systems includes a light source selection part selecting one of the light sources of the one of the scanning optical systems.

30 Claims, 7 Drawing Sheets

U.S. PATENT DOCUMENTS

| | | | |
|---|---|---|---|
| 6,317,246 B1 | 11/2001 | Hayashi et al. | 359/204 |
| 6,369,927 B2 | 4/2002 | Hayashi | 359/196 |
| 6,384,949 B1 | 5/2002 | Suzuki | 359/196 |
| 6,388,792 B1 | 5/2002 | Atsuumi et al. | 359/207 |
| 6,400,391 B1 | 6/2002 | Suhara et al. | 347/244 |
| 6,400,917 B2 | 6/2002 | Nakazato et al. | 399/111 |
| 6,417,509 B1 | 7/2002 | Atsuumi et al. | 250/234 |
| 6,429,956 B2 | 8/2002 | Itabashi | 359/204 |
| 6,445,482 B1 | 9/2002 | Hayashi | 359/205 |
| 6,448,998 B1 | 9/2002 | Suzuki et al. | 347/258 |
| 6,462,853 B2 | 10/2002 | Hayashi | 359/205 |
| 6,485,126 B1 | 11/2002 | Kato et al. | 347/54 |
| 6,496,293 B2 | 12/2002 | Kawamura | 359/212 |
| 6,497,474 B2 | 12/2002 | Irinoda et al. | 347/54 |
| 6,498,617 B1 | 12/2002 | Ishida et al. | 347/252 |
| 6,509,995 B1 | 1/2003 | Suzuki et al. | 359/196 |
| 6,573,921 B2 | 6/2003 | Hayashi | 347/131 |
| 6,587,245 B2 | 7/2003 | Hayashi | 359/204 |
| 6,596,985 B2 | 7/2003 | Sakai et al. | 250/234 |

* cited by examiner

IMAGE FORMATION WITH A REDUCED RECORDING POSITION DEVIATION BETWEEN SCANNING OPTICAL SYSTEMS

BACKGROUND OF THE INVENTION

1. Field of the Invention

The present invention generally relates to optical scanning devices, imaging apparatuses, and imaging methods, and more particularly to an optical scanning device including a plurality of scanning optical systems having a plurality of light sources and arranged in a main scanning direction, an imaging apparatus forming an image by means of such an optical scanning device, and an imaging method using such an optical scanning device.

2. Description of the Related Art

An optical scanning device scanning a surface to be scanned (a scanned surface) with a light beam from a light source deflected by a deflector and passing through a scanning optical element can cover a large scanning area by dividing the scanned surface in a main scanning direction even if the optical scanning device is compact. Further, since the optical scanning device has each of its scanning optical systems and scanning optical elements reduced in size, it becomes easy to correct wave front aberration correlated greatly with a beam spot diameter so that a variation in the beam spot diameter due to a component variation or a component attachment error can be minimized.

On the other hand, the scanning optical system can have a higher scanning rate by including a plurality of light beams.

However, if the scanned surface is divided in the main scanning direction, a deviation between recording positions at the joint of scanning areas causes image degradation. Further, if each scanning optical system employs a plurality of light beams, it is difficult to match the recording positions in a sub scanning direction.

Japanese Laid-Open Patent Application No. 10-246861 discloses an apparatus that correct the joint of scanning areas in the main scanning direction by controlling the recording timing of one of a pair of laser scanning optical systems.

However, if each of the laser scanning optical systems employs a plurality of light beams, recording positions are prevented from being matched in the sub scanning direction with high accuracy.

SUMMARY OF THE INVENTION

It is a general object of the present invention to provide an optical scanning device, an imaging apparatus, and an imaging method in which the above-described disadvantages are eliminated.

A more specific object of the present invention is to provide an optical scanning device, an imaging apparatus, and an imaging method by which a recording end position in the scanning area of a first scanning optical system and a recording start position in the adjacent scanning area of a second scanning optical system can be matched with high accuracy in main and sub scanning directions.

The above objects of the present invention are achieved by an optical scanning device including a plurality of scanning optical systems arranged in a main scanning direction each including a plurality of light sources emitting light beams, a light source driving circuit modulating the emitted light beams separately, and a deflector causing the light beams to perform scanning, wherein at least one of the scanning optical systems comprises a light source selection part selecting one of the light sources of the one of the scanning optical systems.

According to the above-described optical scanning device, one of the light sources of the one of the scanning optical systems which one includes the light source selection part is selected so as to minimize a deviation in the sub scanning direction between scanning start and end positions in the scanning area of the one of the scanning optical systems and a scanning area adjacent thereto at the joint of the two scanning areas. Therefore, the optical scanning device can perform scanning with the scanning start and end positions being matched in the sub scanning direction with high accuracy at the joint of the scanning areas.

Additionally, the light source driving circuit may include a function of correcting a modulation frequency for each of the light beams.

Thereby, the optical scanning device can perform scanning with the scanning start and end positions being matched also in the main scanning direction with high accuracy at the joint of the scanning areas.

The above objects of the present invention are also achieved by an imaging apparatus including an optical scanning device having a plurality of scanning optical systems arranged in a main scanning direction, wherein the scanning optical systems each includes a plurality of light sources emitting light beams, a light source driving circuit modulating the emitted light beams separately, and a deflector causing the light beams to perform scanning, and at least one of the scanning optical systems includes a light source selection part selecting one of the light sources of the one of the scanning optical systems.

The above-described imaging apparatus includes an optical scanning device that produces the same effects as described above. Therefore, the above-described imaging apparatus can improve the quality of an output image.

Additionally, the light source driving circuit of the above-described imaging apparatus may include a function of correcting a modulation frequency for each of the light beams.

Thereby, for the same reason as described above, the above-described imaging apparatus can improve the quality of an output image.

The above objects of the present invention are also achieved by an imaging method employing an optical scanning device including a plurality of scanning optical systems arranged in a main scanning direction, the imaging method including the steps of (a) generating a light source selection signal in at least one of the scanning optical systems to select one of light sources thereof, the one of the light sources being used for recording image information of a first line of a scanning area scanned by the one of the scanning optical systems, (b) emitting light beams from the light sources in the one of the scanning optical systems, the light beams being modulated separately by a light source driving circuit of the one of the scanning optical systems, and (c) performing scanning with the light beams being deflected by a deflector of the one of the scanning optical systems.

According to the above-described imaging method, one of the light sources of the one of the scanning optical systems which one includes the light source selection part is selected so as to minimize a deviation in the sub scanning direction between scanning start and end positions in the scanning area of the one of the scanning optical systems and a scanning area adjacent thereto at the joint of the two scanning areas. Therefore, scanning can be performed with the scanning start and end positions being matched in the sub scanning direction with high accuracy at the joint of the scanning areas.

Additionally, the above-described imaging method may further include the step of (d) correcting a modulation frequency for each of the light beams by the light source driving circuit.

Thereby, scanning can be performed with the scanning start and end positions being matched also in the main scanning direction with high accuracy at the joint of the scanning areas.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with respect to the accompanying drawings, of an embodiment of the present invention.

Figure 1:
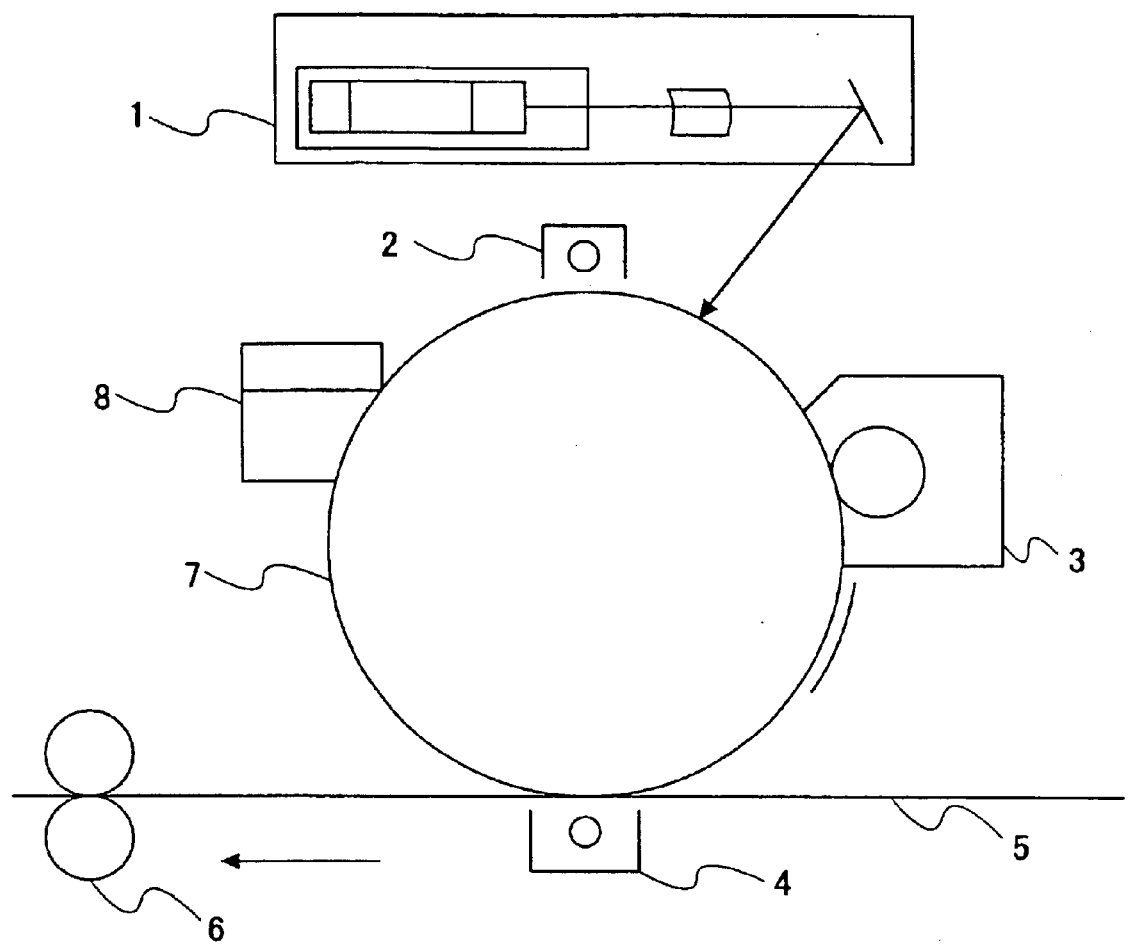
FIG. 1 is a diagram showing a configuration of an imaging apparatus according to the present invention.

FIG. 1 is a diagram showing a configuration of an imaging apparatus according to the present invention. The imaging apparatus includes an optical scanning device 1, a charging device 2, a developing device 3, a transfer charging device 4, a fixing device 6, a photosensitive body 7, and a cleaner 8. The imaging apparatus employs a well-known principle of image formation. That is, the photosensitive body 7, which is uniformly charged by the charging device 2, has its electrical potential reduced in accordance with a distribution of exposure formed by the optical scanning device 1 so that an electrostatic latent image is formed on the photosensitive body. Then, the developing device 3 causes the toner to adhere to the photosensitive body 7. The toner adhering to the photosensitive body 7, after being transferred to a paper sheet 5 by the transfer charging device 4, is melted and fixed on the paper sheet 5 by the fixing device 6. The cleaner 8 removes residual toner from the surface (a surface to be scanned or a scanned surface) of the photosensitive body 7.

Figure 2:
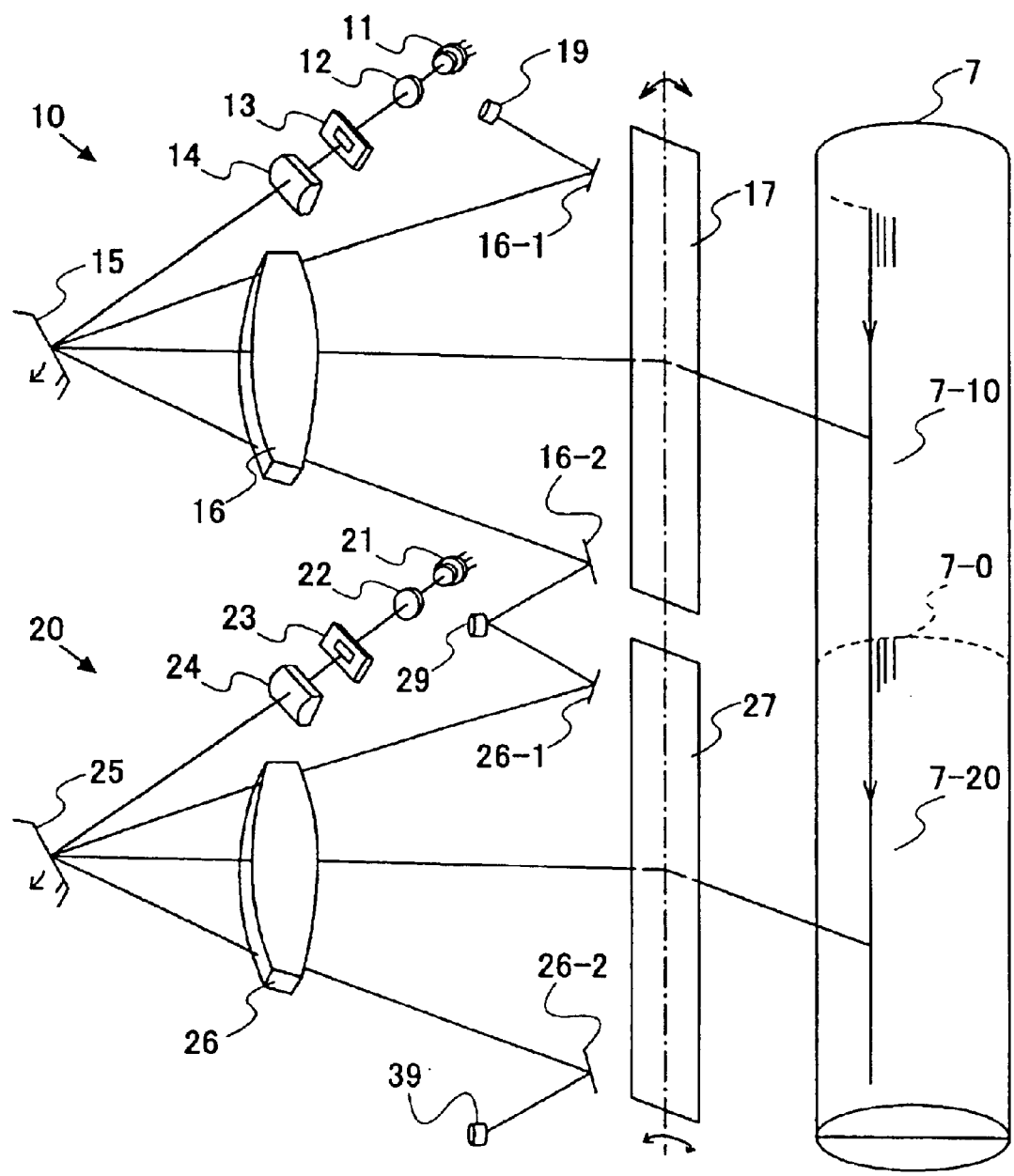
FIG. 2 is a diagram showing an optical disposition of an optical scanning device of the imaging apparatus of FIG. 1.

FIG. 2 is a diagram showing an optical disposition of the optical scanning device 1. The optical scanning device 1 includes scanning optical systems 10 and 20. The scanning optical systems 10 and 20 include semiconductor laser arrays 11 and 21, coupling lenses 12 and 22, apertures 13 and 23, cylindrical lenses 14 and 24, polygon scanners (deflectors) 15 and 25, scanning lenses 16 and 26, mirrors 16-1 and 16-2 and 26-1 and 26-2, bending mirrors 17 and 27, and light-receiving elements 19 and 39, respectively. A light-receiving element 29 is a component common to the scanning optical systems 10 and 20.

The scanning optical systems 10 and 20 are arranged in a main scanning direction so that their respective scanning areas 7-10 and 7-20 on the surface of the photosensitive body 7 are connected side by side in the main scanning direction by a joint 7-0.

Figure 3:
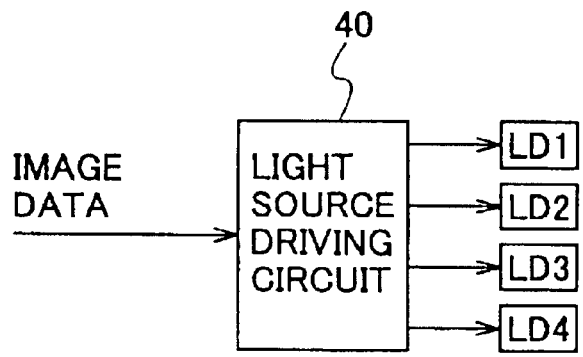
FIG. 3 is a diagram showing a configuration of a light source driving circuit of each of scanning optical systems of the optical scanning device.

Each of the semiconductor laser arrays 11 and 21 includes four light sources LD1 through LD4 emitting light beams that are modulated separately from one another in accordance with image data by light source driving circuits 40 shown in FIG. 3 of the scanning optical systems 10 and 20, respectively. Each of the light source driving circuits 40 employs a well-known configuration in the field of multi-beam scanning techniques in addition to any of configurations corresponding to later-described FIGS. 7 through 9. The light beams emitted from the light sources LD1 through LD4 of the semiconductor laser arrays 11 and 21 are coupled by the coupling lenses 12 and 22, respectively. Here, the light beams coupled by the coupling lens 12 of the scanning optical system 10 are referred to as a first light beam, and the light beams coupled by the coupling lens 22 of the scanning optical system 20 are referred to as a second light beam. Thereafter, the first and second light beams pass through the apertures 13 and 23 and the cylindrical lenses 14 and 24, each of which has power in the sub scanning direction, to be focused into line images long in the main scanning direction on the polygon scanners 15 and 25 or in the vicinities thereof, respectively. Further, the first and second light beams are deflected by the polygon scanners 15 and 25 to pass through the scanning lenses 16 and 26. The polygon scanners 15 and 25 are rotated in the same direction by a driving mechanism (not shown in the drawing) to deflect the first and second light beams so that the first and second light beams of the scanning optical systems 10 and 20 scan the surface of the photosensitive body 7 equally in the main scanning direction.

The mirrors 16-1 and 26-1 are disposed in positions on which the first and second light beams that have passed through the scanning lenses 16 and 26 are made incident before reaching the bending mirrors 17 and 27. The first and second light beams reflected back from the mirrors 16-1 and 26-1 are made incident on the light-receiving elements 19 and 29, respectively. The light-receiving elements 19 and 29 receive and detect the first and second light beams from the scanning lenses 16 and 26 to generate synchronizing detection signals indicating the start of each scan.

The first and second light beams, after reaching the bending mirrors 17 and 27, are bent in a direction toward the photosensitive body 7 to be incident thereon so that the light beams emitted from the light sources LD1 through LD4 of each of the first and second light beams scan given scanning areas with a given distance kept in the sub scanning direction between each adjacent two of the light beams.

The mirrors 16-2 and 26-2 are disposed in positions on which the first and second light beams are made incident after scanning the given scanning areas. The first and second light beams reflected back from the mirrors 16-2 and 26-2 are made incident on the light-receiving elements 29 and 39, respectively. The light-receiving elements 29 and 39 receive and detect the first and second light beams from the scanning lenses 16 and 26 to generate synchronizing detection signals indicating the end of each scan.

The light source driving circuit 40 of the scanning optical system 10 is capable of measuring a period of scanning time between a time at which the first light beam is received by the light-receiving element 19 and a time at which the first light beam is received by the light-receiving element 29, using the results of detection of the first light beam by the light-receiving elements 19 and 29. Similarly, the light source driving circuit 40 of the scanning optical system 20 is capable of measuring a period of scanning time between a time at which the second light beam is received by the light-receiving element 29 and a time at which the second light beam is received by the light-receiving element 39 by means of the light-receiving elements 29 and 39.

The scanning optical systems 10 and 20 control respective recording start times based on times at which the light-receiving elements 19 and 29 detect the first and second light beams. Therefore, the light sources LD1 through LD4 of the scanning optical systems 10 and 20 are switched off between the times at which the light-receiving elements 19 and 29 detect the first and second light beams and the recording start times so as to prevent the first and second light beams from being incident on the photosensitive body 7 and forming a latent image. Once recording is started, the scanning optical systems 10 and 20 perform drawing modulation such as on-off keying or intensity modulation on the first and second light beams and scan the surface of the photosensitive body 7 rotated by the driving mechanism so as to form a desired latent image on the surface of the photosensitive body 7.

The scanning optical system 10 can align positions from which recording is performed in the main scanning direction (recording start positions) by keeping a period of time between the time at which the light-receiving element 19 detects the first light beam and the recording start time constant in each scan. Similarly, the scanning optical system 20 can align its recording start positions.

Figure 4:
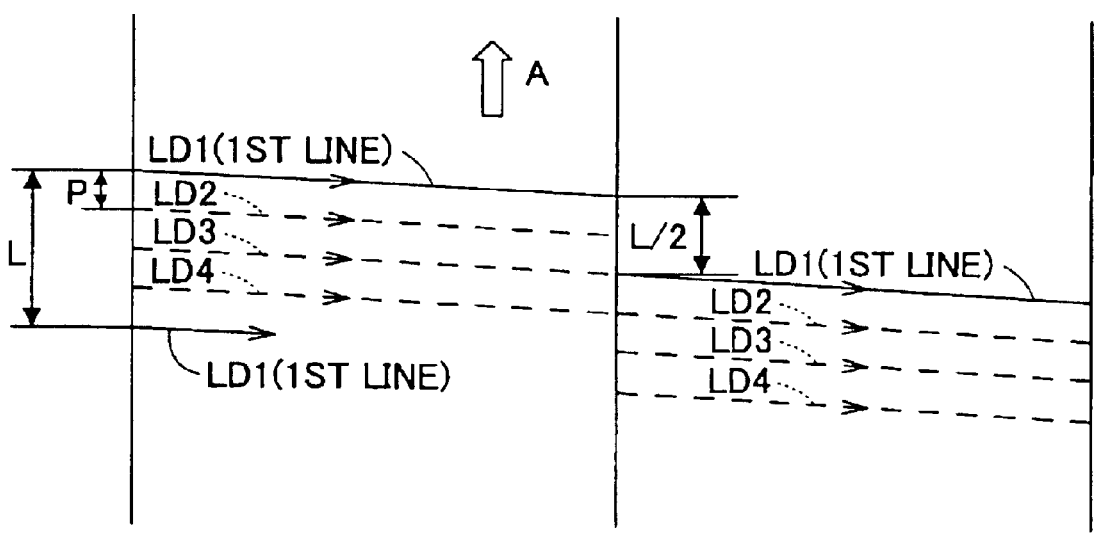
FIG. 4 is a diagram showing scanning lines on a scanned surface in the case of performing scanning by means of a conventional optical scanning device including a plurality of scanning optical systems.

FIG. 4 is a diagram showing scanning lines on a scanned surface in the case of performing scanning by means of a conventional optical scanning device including a plurality of scanning optical systems.

The right and left scanning areas of FIG. 4 are scanned by the separate scanning optical systems. Each of the separate scanning optical systems causes its four light beams to almost simultaneously scan a corresponding one of the scanning areas from left to right at one time. Since the scanned surface is moved in the upward direction of FIG. 4 (a direction indicated by arrow A), the scanning lines run obliquely from upper left to lower right on the scanned surface as shown in FIG. 4. In this case, the scanning optical system scanning the right scanning area of FIG. 4 includes a part controlling a recording start time (a recording start time control part).

In the conventional optical scanning device, if each scanning optical system has its light source LD1 preset as a light source for scanning a first line in the corresponding scanning area, a maximum deviation in the sub scanning direction between each pair of corresponding scanning lines of the two scanning areas at the joint thereof is L/2, letting the scanning cycle of a polygon scanner be L.

Figure 5:
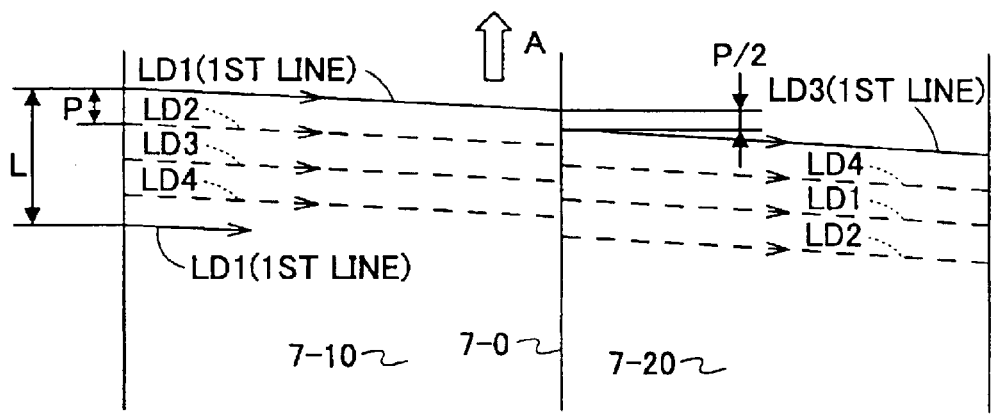
FIG. 5 is a diagram showing scanning lines on a scanned surface in the case of performing scanning by means of the optical scanning device.

FIG. 5 is a diagram showing scanning lines on the scanned surface in the case of performing scanning by means of the optical scanning device 1 of the present invention. The scanning direction of each of the scanning optical systems 10 and 20 and the direction in which the scanned surface is moved are equal to those of FIG. 4.

The scanning optical system 20 includes a later-described light source selection part for recording the image information of a first line in addition to the recording start time control part of the conventional optical scanning device. In this case, a maximum deviation in the sub scanning direction between each one of recording (end) positions in the scanning area 7-10 of the scanning optical system 10 and a corresponding one of recording (start) positions in the scanning area 7-20 of the scanning optical system 20 at the joint 7-0 is P/2, letting a pitch between each adjacent two of the scanning lines of the light sources LD1 through LD4 be P.

Figure 6:
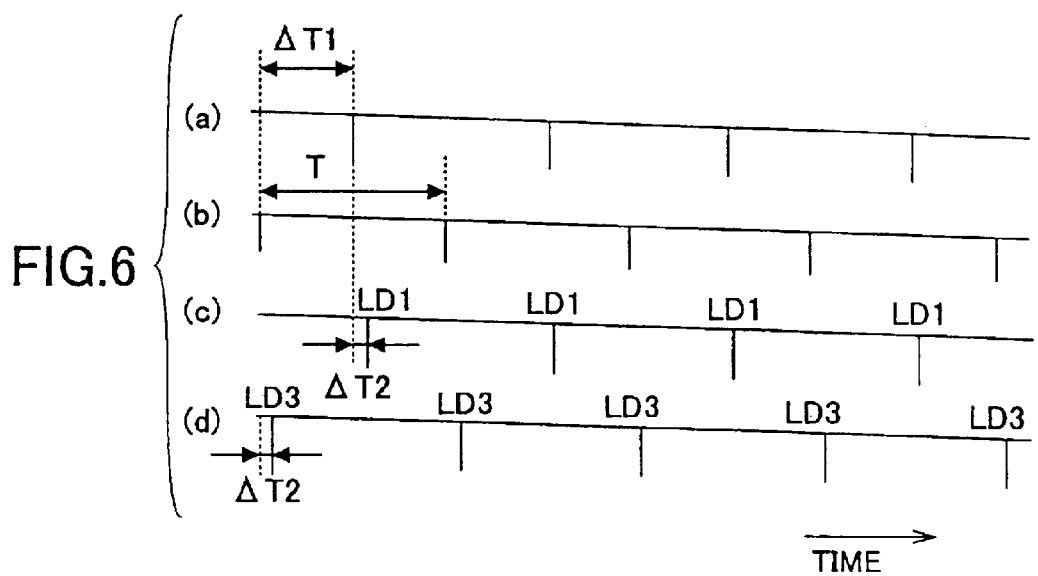
FIG. 6 is a timing chart of signals for illustrating timings at which recording operations are started by synchronizing detection signals of the optical scanning device.

A description will be given below of the light source selection part. In this case, the scanning optical system 20 includes the light source selection part. FIG. 6 is a timing chart of signals for illustrating timings at which recording operations are started by the synchronizing detection signals of the optical scanning device 1 of the present invention. FIG. 6(a) shows the synchronizing detection signal indicating the start of each scan in the scanning area 7-10, FIG. 6(b) shows the synchronizing detection signal indicating the start of each scan in the scanning area 7-20, FIG. 6(c) shows a light-emitting signal output at the start of recording (writing) in the scanning area 7-10, and FIG. 6(d) shows a light-emitting signal output at the start of recording (writing) in the scanning area 7-20. Further, $\Delta T1$ represents a time difference between the synchronizing detection signals of the scanning optical systems 10 and 20.

After a given period of time $\Delta T2$ passes since the generation of the synchronizing detection signals indicating the start of each scan, the light beams emitted from the light sources LD1 through LD4 of each of the scanning optical systems 10 and 20 are modulated in accordance with image information by the light source driving circuit 40 to have the photosensitive body 7 exposed accordingly, so that the image information is recorded thereon.

A description will now be given, with reference to FIG. 6, of a method of minimizing a deviation in the sub scanning direction between each one of the recording (end) positions in the scanning area 7-10 of the scanning optical system 10 and a corresponding one of the recording (start) positions in the scanning area 7-20 of the scanning optical system 20 at the joint 7-0 by means of the optical scanning device 1 of the present invention.

The causes of the generation of the deviation at the joint 7-0 of the scanning areas 7-10 and 7-20 are a difference between the recording start times of the scanning optical systems 10 and 20 and a deviation in the sub scanning direction between each one of scanning (end) positions of the scanning optical system 10 and a corresponding one of scanning (start) positions of the scanning optical system 20. This deviation in the sub scanning direction is caused, for instance, by a fabrication error or attachment position error of the scanning optical system 10 or 20.

Here, for simplicity purposes, a recording end position of the scanning optical system 10 shall match a corresponding recording start position of the scanning optical system 20 in the sub scanning direction when the synchronizing detection signals for the scanning areas 7-10 and 7-20 coincide with each other, that is, when $\Delta T1=0$. Therefore, the deviation in the sub scanning direction between the corresponding recording positions of the scanning optical systems 10 and 20 at the joint 7-0 may be minimized by selecting an appropriate one of the light sources LD1 through LD4 for recording the image information of the first line of the scanning area 7-20 based on a difference between the recording start times of the scanning optical systems 10 and 20.

Japanese Laid-Open Patent Application No. 11-212009 discloses a multi-beam recording apparatus that selects one of light sources for recording the image information of a first line.

The present invention applies the invention disclosed in the above-mentioned patent application to selection of a light source for minimizing the deviation in the sub scanning direction between the corresponding recording positions at the joint 7-0 of the scanning areas 7-10 and 7-20 of the scanning optical systems 10 and 20. Both inventions relate to selecting one of light sources for recording the image information of a first line based on a time difference between two signals. However, according to the present invention, the light source is selected based on the recording start times of the scanning optical systems 10 and 20 to minimize the deviation in the sub scanning directions between the corresponding recording positions at the joint 7-0 of the scanning areas 7-10 and 7-20 of the scanning optical systems 10 and 20, while, according to the invention disclosed in the above-described patent application, the light source is selected based on a time difference between a main scan synchronizing signal and a recording start signal in order to reduce a longitudinal register deviation between pages of one scanning optical system.

A relationship between the difference between the recording start times of the scanning optical systems 10 and 20 and the light source for recording the image information of the first line of the scanning optical system 20 is defined as follows:

Select the light source LD1 if $0 \leq \Delta T1 < (\frac{1}{8})T$

Select the light source LD2 if $(\frac{1}{8})T \leq \Delta T1 < (\frac{3}{8})T$

Select the light source LD3 if $(\frac{3}{8})T \leq \Delta T1 < (\frac{5}{8})T$

Select the light source LD4 if $(\frac{5}{8})T \leq \Delta T1 < (\frac{7}{8})T$

Select the light source LD1 if $(\frac{7}{8})T \leq \Delta T1 < T$ (the light source LD1 emits light after the next output timing of the synchronizing detection signal for the scanning area 7-20)

Here, T is an interval (a period of time) between two successive output timings of the synchronizing detection signal of the scanning optical system 20.

Figure 7:
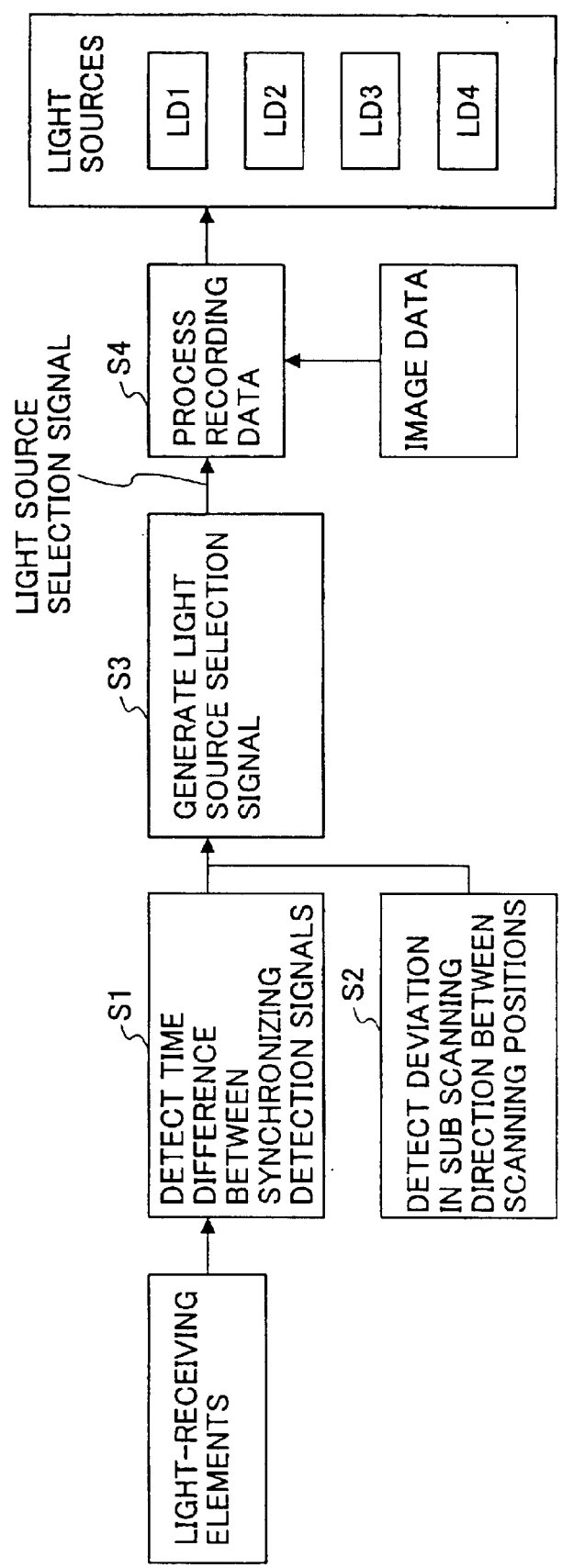
FIG. 7 is a flowchart of an operation of a light source selection part of the optical scanning device.

FIG. 7 is a flowchart of an operation of the light source selection part of the optical scanning device 1.

First, in step S1, the time difference $\Delta T1$ between the synchronizing detection signals for the scanning areas 7-10 and 7-20 is detected based on the synchronizing detection signals transmitted from the light-receiving elements 19 and 29. Then, in step S2, the deviation in the sub scanning direction between the corresponding scanning positions of the scanning areas 7-10 and 7-20 is detected. The deviation in the sub scanning direction may be obtained by measuring the initial characteristics of the optical scanning device 1 by means of a detector such as a charge-coupled device (CCD) or be detected by providing a detector such as a CCD in the optical scanning device 1. A period of time required for the corresponding recording positions of the scanning areas 7-10 and 7-20 to match each other at the joint 7-0 can be set based on the deviation in the sub scanning direction. This period of time is referred to as an ideal time difference $\Delta T1'$ between the scanning areas 7-10 and 7-20. That is, the ideal time difference $\Delta T1'$ can be expressed in the following expression:

$$\Delta T1' = \Delta T1 + \delta t$$

where $\delta t$ is a value for correction corresponding to the deviation in the sub scanning direction, such as a deviation measured at the time of shipping which deviation is mechanically caused between the corresponding scanning positions at the joint of the scanning areas 7-10 and 7-20. This deviation in the sub scanning direction may be stored in a ROM of the light source driving circuit 40 of the scanning optical system 20.

Next, in step S3, a light source selection signal is generated based on the ideal time difference obtained based on the detected time difference between the synchronizing detection signals so that the light source for recording the image information of the first line of the scanning area 7-20 is selected by the method described above with reference to FIG. 6. That is, Select the light source LD1 if $0 \leq \Delta T1' < (\frac{1}{8})T$ Select the light source LD2 if $(\frac{1}{8})T \leq \Delta T1' < (\frac{3}{8})T$ Select the light source LD3 if $(\frac{3}{8})T \leq \Delta T1' < (\frac{5}{8})T$ Select the light source LD4 if $(\frac{5}{8})T \leq \Delta T1' < (\frac{7}{8})T$ Select the light source LD1 if $(\frac{7}{8})T \leq \Delta T1' < T$ (the light source LD1 emits light after the next output timing of the synchronizing detection signal for the scanning area 7-20)

Thereafter, in step S4, recording data is processed based on image data, and the light beams emitted from the light sources LD1 through LD 4 of the scanning optical system 20 are modulated.

To sum up, the light source selection part generates the light source selection signal based on the difference between the recording start times of the scanning optical systems 10 and 20 and the deviation in the sub scanning direction between the corresponding scanning positions to select the light source for recording the image information of the first line of the scanning area 7-20.

Further, the light source selection part employs the difference between the synchronizing detection signals detected in the scanning optical systems 10 and 20 as the difference between the recording start times of the scanning optical systems 10 and 20.

Furthermore, the light source selection part employs the ideal time difference set based on the above-described deviation between the corresponding scanning positions measured by the detector as the deviation in the sub scanning direction between the corresponding scanning positions of the scanning optical systems 10 and 20.

The optical scanning device 1 of FIG. 2 includes the two scanning optical systems 10 and 20. However, the optical scanning device 1 may include more than two scanning optical. Further, each of the semiconductor laser arrays 11 and 21 includes the four light sources LD1 through LD4 in this embodiment, but the number of light sources is not limited to four.

According to this embodiment, as shown in FIG. 2, the scanning optical systems 10 and 20 of the optical scanning device 1 include the semiconductor laser arrays (light sources) 11 and 21, the light source driving circuits 40 that modulate the light beams emitted from the semiconductor laser arrays 11 and 21, and the polygon scanners 15 and 25 for deflecting the light beams so that the light beams scan the surface of the photosensitive body 7, respectively. Each of the light source driving circuits 40 can modulate the light beams emitted from the semiconductor laser arrays 11 or 21 separately from one another. Further, at least one of the scanning optical systems 10 and 20 includes the light source selection part. According to this configuration, the optical scanning device 1 is capable of performing scanning with the corresponding recording positions of the scanning areas 7-10 and 7-20 being matched in the sub scanning direction with high accuracy at the joint 7-0.

According to this embodiment, each of the light source driving circuits 40 has the function of correcting a modulation frequency (a frequency of a pixel clock signal) based on the scanning time of the scanning area 7-10 or 7-20 measured by means of the light-receiving elements 19 and 29 or 29 and 39. This correction may be made either based on a magnification predetermined before a scan or by comparing the magnifications of the scanning optical systems 10 and 20 during a scan.

The optical scanning device 1 can reduce an error in magnification between the scanning optical systems 10 and 20 by means of the function of correcting the modulation frequency of each light source driving circuit 40. Thereby, the recording end positions in the scanning area 7-10 and the corresponding recording start positions in the scanning area 7-20 can be matched substantially, thus minimizing the deviation in the main scanning direction between the corresponding recording positions at the joint 7-0.

Since each light source driving circuit 40 includes the modulation frequency correction function, the optical scanning device 1 is capable of performing scanning with the corresponding recording positions of the scanning areas 7-10 and 7-20 being matched in the main scanning direction with high accuracy at the joint 7-0.

Figure 8:
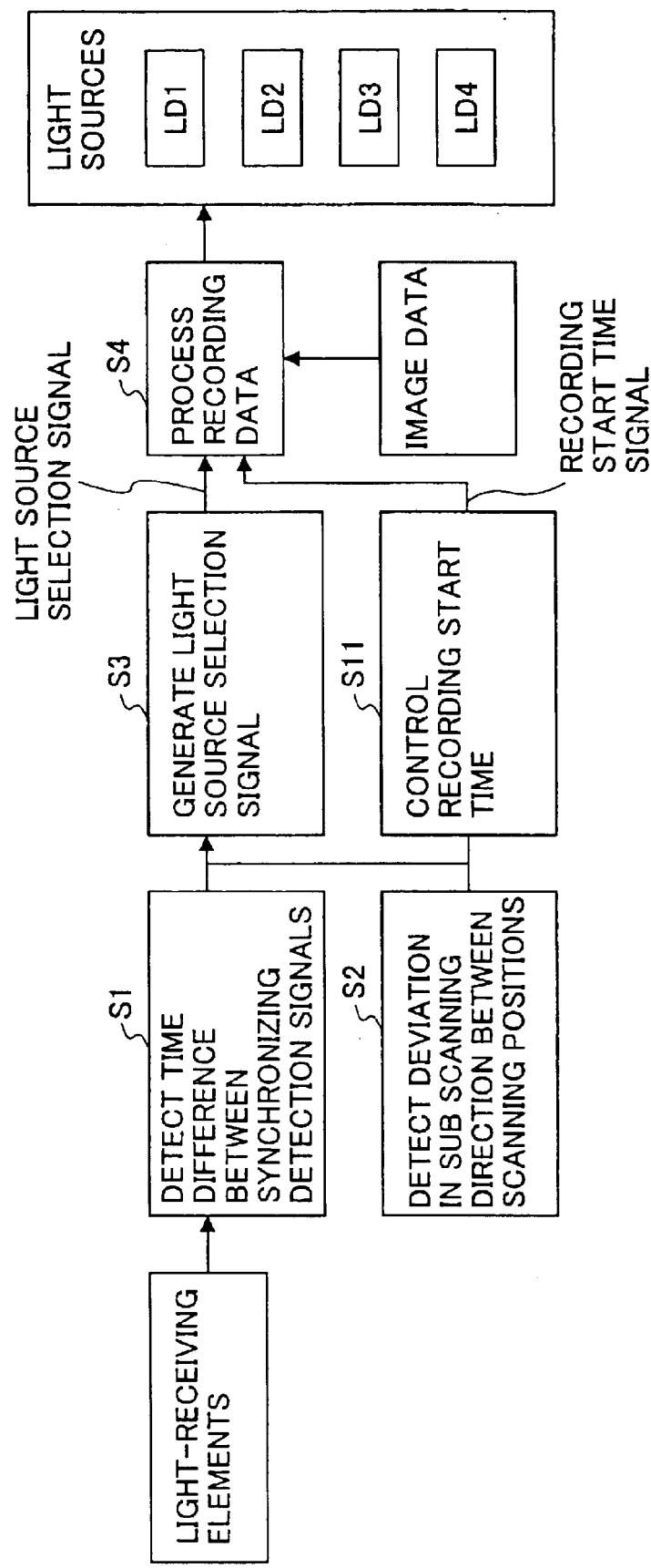
FIG. 8 is a flowchart of another operation of the light source selection part of the optical scanning device.

FIG. 8 is a flowchart of another operation of the light source selection part of the optical scanning device 1. In addition to steps S1 through S4 of FIG. 7, the operation shown in FIG. 8 further includes step S11 of setting the recording start time of the scanning area 7-20 based on the deviation in the sub scanning direction between the corresponding scanning positions and generating a recording start time signal by means of the recording start time control part.

According to FIG. 8, since the scanning optical system 7-20 having the light source selection part further includes the recording start time control part that controls the recording start time of the image information of the first line of the scanning area 7-20, the optical scanning device 1 is capable of performing scanning with the corresponding recording positions of the scanning areas 7-10 and 7-20 being matched in the sub scanning direction with higher accuracy at the joint 7-0.

Figure 9:
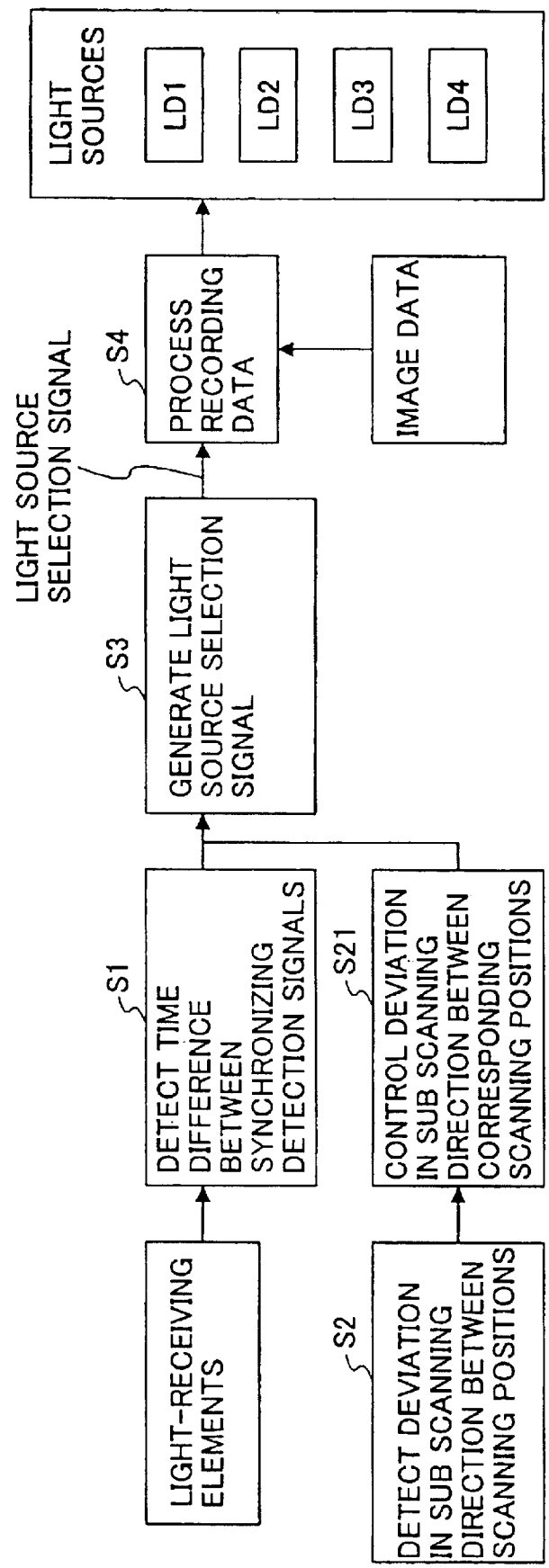
FIG. 9 is a flowchart of yet another operation of the light source selection part of the optical scanning device.

FIG. 9 is a flowchart of yet another operation of the light source selection part of the optical scanning device 1. In addition to steps S1 through S4 of FIG. 7, the operation shown in FIG. 9 further includes step S21 of turning the bending mirror 27 about an axis parallel to the main scanning direction based on the deviation in the sub scanning direction between the corresponding scanning positions of the scanning areas 7-10 and 7-20 at the joint 7-0 thereof so as to control the deviation. This operation of step S21 is performed by means of a scanning position deviation control part that controls the deviation in the sub scanning direction between the corresponding scanning positions of the scanning areas 7-10 and 7-20 at the joint 7-0.

According to FIG. 9, since the scanning optical system 7-20 having the light source selection part further includes the scanning position deviation control part that controls the deviation in the sub scanning direction between the corresponding scanning positions of the scanning areas 7-10 and 7-20 at the joint 7-0, the optical scanning device 1 is capable of performing scanning with the corresponding recording positions of the scanning areas 7-10 and 7-20 being matched in the sub scanning direction with higher accuracy at the joint 7-0.

The imaging apparatus of FIG. 1 including the above-described optical scanning device 1 shown in FIG. 2 forms an image by performing scanning with the corresponding recording positions of the scanning areas 7-10 and 7-20 of the scanning optical systems 10 and 20 being matched in the main and sub scanning directions with high accuracy at the joint 7-0. Therefore, the imaging apparatus of FIG. 1 can improve the quality of an output image.

According to an imaging method employing the optical scanning device 1 including the scanning optical systems 10 and 20 as shown in FIG. 2, at least one of the scanning optical systems 10 and 20 generates the light source selection signal based on the difference between the recording start times of the scanning optical systems 10 and 20 and the deviation in the sub scanning direction between the corresponding scanning positions of the scanning areas 7-10 and 7-20 at the joint 7-0 thereof, selects one of the light sources LD1 through LD4 which one is used for recording the image information of the first line of a corresponding one of the scanning areas 7-10 and 7-20, emits from the light sources LD1 through LD4 the light beams modulated by the corresponding light source driving circuit 40 that is capable of modulating the light beams of the light sources LD1 through LD4 separately from one another, and deflects the light beams by a corresponding one of the polygon scanners 15 and 25, so that the optical scanning device 1 performs scanning. Thereby, an image is formed by performing scanning with the corresponding recording positions of the scanning areas 7-10 and 7-20 of the scanning optical systems 10 and 20 being matched in the main and sub scanning directions with high accuracy at the joint 7-0, so that the quality of an output image can be improved.

The present invention is not limited to the specifically disclosed embodiment, but variations and modifications may be made without departing from the scope of the present invention.

The present application is based on Japanese priority application No. 2000-328806 filed on Oct. 27, 2000, the entire contents of which are hereby incorporated by reference.

What is claimed is:

1. An optical scanning device comprising:
   a plurality of scanning optical systems arranged in a main scanning direction, the scanning optical systems each comprising:
   a plurality of light sources emitting light beams;
   a light source driving circuit modulating the emitted light beams separately; and
   a deflector causing the light beams to perform scanning,
   wherein at least one of the scanning optical systems comprises a light source selection part selecting one of said light sources of the one of the scanning optical systems,
   wherein the scanning optical systems include first and second scanning optical systems scanning first and second scanning areas adjacent to each other, respectively, the first scanning optical system comprising said light source selection part, and
   wherein said light source selection part generates a light source selection signal and selects the one of the light sources which one is used for recording image information of a first line of the first scanning area.

2. The optical scanning device as claimed in claim 1, wherein said light source driving circuit comprises a function of correcting a modulation frequency for each of the light beams.

3. The optical scanning device as claimed in claim 1, wherein said light source selection part generates the light source selection signal based on a difference between recording start times of the first and second scanning optical systems and a scanning position deviation in a sub scanning direction between a scanning end position of the second scanning area and a corresponding scanning start position of the first scanning area.

4. The optical scanning device as claimed in claim 3, wherein a time difference between synchronizing detection signals of the first and second scanning optical systems, respectively, is employed as the difference between the recording start times, the synchronizing detection signals being detected in the first and second scanning optical systems when the first and second scanning optical systems start scanning, respectively.

5. The optical scanning device as claimed in claim 3, wherein the first scanning optical system further comprises a recording start time control part controlling a recording start time of the image information of the first line of the first scanning area.

6. The optical scanning device as claimed in claim 5, wherein said recording start time control part generates a recording start time signal based on the scanning position deviation.

7. The optical scanning device as claimed in claim 6, wherein said light source driving circuit separately modulates the light beams based on the light source selection signal and the recording start time signal.

8. The optical scanning device as claimed in claim 3, wherein the first scanning optical system further comprises a scanning position control part controlling the scanning position deviation.

9. The optical scanning device as claimed in claim 8, wherein said scanning position control part turns a bending mirror of the first scanning optical system around an axis parallel to the main scanning direction.

10. The optical scanning device as claimed in claim 3, wherein the scanning position deviation is obtained by measuring initial characteristics of the optical scanning device.

11. The optical scanning device as claimed in claim 3, wherein the scanning position deviation is detected by a detector provided in the optical scanning device.

12. The optical scanning device as claimed in claim 11, wherein the detector is a charge-coupled device.

13. The optical scanning device as claimed in claim 1, wherein said light source selection part generates the light source selection signal based on an ideal time difference that is a period of time required for matching a recording end position of the second scanning area and a corresponding recording start position of the first scanning area at a joint of the first and second scanning areas.

14. The optical scanning device as claimed in claim 13, wherein the ideal time difference is obtained based on a difference between recording start times of the first and second scanning optical systems and a scanning position deviation in a sub scanning direction between a scanning end position of the second scanning area and a corresponding scanning start position of the first scanning area.

15. The optical scanning device as claimed in claim 1, wherein:
the first scanning optical system further comprises a recording start time control part controlling a recording start time of image information of a first line of the first scanning area.

16. The optical scanning device as claimed in claim 15, wherein said recording start time control part generates a recording start time signal based on a scanning position deviation in a sub scanning direction between a scanning end position of the second scanning area and a corresponding scanning start position of the first scanning area.

17. The optical scanning device as claimed in claim 1, wherein:
the first scanning optical system further comprises a scanning position control part controlling a scanning position deviation in a sub scanning direction between a scanning end position of the second scanning area and a corresponding scanning start position of the first scanning area.

18. An optical scanning device comprising:
a plurality of scanning optical systems arranged in a main scanning direction, the scanning optical systems each comprising:
a plurality of light sources emitting light beams;
a light source driving circuit modulating the emitted light beams separately; and
a deflector causing the light beams to perform scanning,
wherein at least one of the scanning optical systems comprises a light source selection part selecting one of said light sources of the one of the scanning optical systems,
wherein the scanning optical systems include first and second scanning optical systems scanning first and second scanning areas adjacent to each other, respectively,
wherein the first scanning optical system comprises said light source selection part and a scanning position control part controlling a scanning position deviation in a sub scanning direction between a scanning end position of the second scanning area and a corresponding scanning start position of the first scanning area, and
wherein said scanning position control part turns a bending mirror of the first scanning optical system around an axis parallel to the main scanning direction.

19. An imaging apparatus including an optical scanning device having a plurality of scanning optical systems arranged in a main scanning direction, wherein each scanning optical system comprises:
a plurality of light sources emitting light beams;
a light source driving circuit modulating the emitted light beams separately; and
a deflector causing the light beams to perform scanning; and
at least one of the scanning optical systems comprises a light source selection part selecting one of said light sources of the one of the scanning optical systems,
wherein the scanning optical systems include first and second scanning optical systems scanning first and second scanning areas adjacent to each other, respectively, the first scanning optical system comprising said light source selection part, and
wherein said light source selection part generates a light source selection signal and selects the one of the light sources which one is used for recording image information of a first line of the first scanning area.

20. The imaging apparatus as claimed in claim 19, wherein said light source driving circuit comprises a function of correcting a modulation frequency for each of the light beams.

21. The imaging apparatus as claimed in claim 19, wherein said light source selection part generates the light source selection signal based on a difference between recording start times of the first and second scanning optical systems and a scanning position deviation in a sub scanning direction between a scanning end position of the second scanning area and a corresponding scanning start position of the first scanning area.

22. The imaging apparatus as claimed in claim 19, wherein scanning optical system further comprises a recording start time control part controlling a recording start time of image information of a first line of a scanning area scanned by the first scanning optical system.

23. The imaging apparatus as claimed in claim 19, wherein:

the first scanning optical system further comprises a scanning position control part controlling a scanning position deviation in a sub scanning direction between a scanning end position of the second scanning area and a corresponding scanning start position of the first scanning area.

24. An imaging method employing an optical scanning device including a plurality of scanning optical systems arranged in a main scanning direction, the imaging method comprising the steps of:

(a) generating a light source selection signal in at least one of the scanning optical systems to select one of light sources thereof, the one of the light sources being used for recording image information of a first line of a scanning area scanned by the one of the scanning optical systems, wherein the light source selection signal is generated based on a time difference between recording start times of the one and an adjacent one of the scanning optical systems and a scanning position deviation in a sub scanning direction between a scanning end position of a scanning area of the adjacent one of the scanning optical systems and a corresponding scanning start position of the scanning area of the one of the scanning optical systems, the scanning areas being adjacent to each other;

(b) emitting light beams from the light sources in the one of the scanning optical systems, the light beams being modulated separately by a light source driving circuit of the one of the scanning optical systems; and (c) performing scanning with the light beams being deflected by a deflector of the one of the scanning optical systems.

25. The imaging method as claimed in claim 24, further comprising the step of (d) correcting a modulation frequency for each of the light beams by the light source driving circuit.

26. The imaging method as claimed in claim 24, further comprising the step of (d) controlling a recording start time of the image information of the first line by generating a recording start time signal in the one of the scanning optical systems based on the scanning position deviation.

27. The imaging method as claimed in claim 26, wherein the light source driving circuit modulates the light beams separately based on the light source selection signal and the recording start time signal.

28. The imaging method as claimed in claim 24, wherein a time difference between synchronizing detection signals of the one and the adjacent one of the scanning optical systems, respectively, is employed as the difference between the recording start times, the synchronizing detection signals being detected in the one and the adjacent one of the scanning optical systems when the one and the adjacent one of the scanning optical systems start scanning, respectively.

29. The imaging method as claimed in claim 24, wherein the scanning position deviation is obtained by measuring initial characteristics of the optical scanning device.

30. An imaging method employing an optical scanning device including a plurality of scanning optical systems arranged in a main scanning direction, the imagine method comprising the steps of:

(a) generating a light source selection signal in at least one of the scanning optical systems to select one of light sources thereof, the one of the light sources being used for recording image information of a first line of a scanning area scanned by the one of the scanning optical systems;

(b) emitting light beams from the light sources in the one of the scanning optical systems, the light beams being modulated separately by a light source driving circuit of the one of the scanning optical systems; and (c) performing scanning with the light beams being deflected by a deflector of the one of the scanning optical systems; and (d) controlling the scanning position deviation by turning a bending mirror of the one of the scanning optical systems about an axis parallel to the main scanning direction.

* * * * *